United States Patent

Johnson

[11] Patent Number: 6,000,095
[45] Date of Patent: Dec. 14, 1999

[54] DUAL PORT AIR BLOWER FOR DRYING VEHICLES

[75] Inventor: Archie L. Johnson, Phoenix, Ariz.

[73] Assignee: Superior Investments, Inc., Phoenix, Ariz.

[21] Appl. No.: 09/130,413

[22] Filed: Aug. 6, 1998

[51] Int. Cl.[6] ................................................. A47L 9/02
[52] U.S. Cl. ..................... 15/316.1; 15/312.1; 15/405; 34/666
[58] Field of Search .............................. 15/312.1, 316.1, 15/317, 318.1, 405; 34/641, 642, 666

[56] References Cited

U.S. PATENT DOCUMENTS

| | | | |
|---|---|---|---|
| 3,224,108 | 12/1965 | Flaming | 34/87 |
| 3,279,093 | 10/1966 | Dutton | 34/229 |
| 3,442,027 | 5/1969 | Hurwitz | 34/571 |
| 3,803,727 | 4/1974 | Takeuchi | 34/229 |
| 3,812,821 | 5/1974 | Laycock | 118/418 |
| 4,393,602 | 7/1983 | Smith | 34/506 |
| 4,561,193 | 12/1985 | Burger | 15/316.1 |
| 4,685,169 | 8/1987 | Nelson | 15/302 |
| 5,048,147 | 9/1991 | Belanger et al. | 15/319 |
| 5,107,566 | 4/1992 | Schmid | 15/328 |
| 5,367,739 | 11/1994 | Johnson | 15/316.1 |
| 5,454,136 | 10/1995 | Gougoulas | 15/312.1 |
| 5,596,818 | 1/1997 | Jones | 34/666 |

OTHER PUBLICATIONS

"Hurricane Touch Free Dryer" brochure, Superior Car Wash Systems, Inc., © 1997.

*Primary Examiner*—Terrence R. Till
*Assistant Examiner*—Theresa T. Snider
*Attorney, Agent, or Firm*—Cahill, Sutton & Thomas, P.L.C.

[57] ABSTRACT

A dual port blowing device for drying a vehicle includes a centrifugal fan powered by a blower motor. The centrifugal fan is rotated upon the motor shaft and surrounded by a housing having a first outlet nozzle for discharging air toward the rear end of the vehicle, and including a second outlet nozzle for discharging air toward the front end of the vehicle. A pivoting damper moves between a first position for sending discharged air through the first outlet nozzle, and a second position for sending discharged air through the second outlet nozzle. An actuator selectively pivots the damper between its first and second positions. The actuator includes a hydraulic cylinder and piston for pivoting the damper. Control circuitry determines when the rear of the vehicle is proximate to the dual port blowing device, and operates the hydraulic cylinder to move the damper from its first position to its second position.

9 Claims, 4 Drawing Sheets

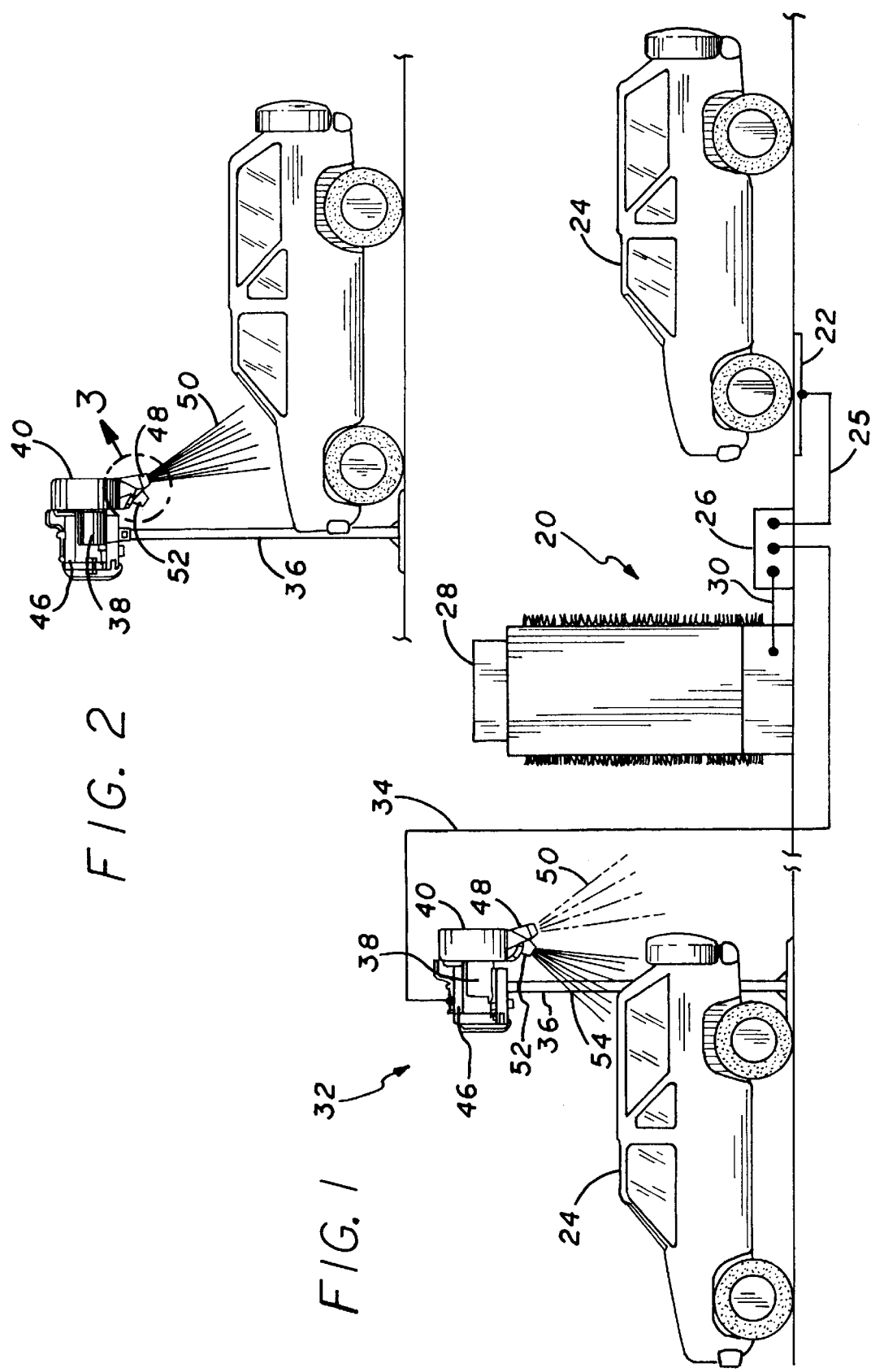

6,000,095

DUAL PORT AIR BLOWER FOR DRYING VEHICLES

BACKGROUND OF THE INVENTION

1. Field of the Invention

The present invention relates generally to devices for blowing air across the surface of vehicles to dry moisture from such vehicles, and more particularly, to devices which can direct a stream of air both toward the rear of the vehicle and toward the front of the vehicle.

2. Description of the Relevant Art

Automated vehicle washing systems have been available for many years to automatically wash and dry vehicles. Large volume vehicle washing systems typically include a conveyor system for moving a vehicle through a series of washing and rinsing stations, and finally, through a drying station which serves to remove moisture from the surface of the vehicle.

A variety of drying stations are known for removing moisture from a vehicle. In one such known drying station, an air duct is pivotally secured to an overhead frame member. For example, in U.S. Pat. No. 5,367,739, issued on Nov. 29, 1994 to the present applicant, an oscillating air blower for drying vehicles is disclosed wherein a drying stream of air is oscillated from side to side, relative to the path of vehicle travel, to more thoroughly dry the entire surface of the vehicle. The oscillating air blower described in U.S. Pat. No. 5,367,739 is an example of a so-called touch-free drying station that avoids any physical contact with the surface of the vehicle. The disclosed oscillating air blower avoids pressure losses which occur in other types of dryer units, thereby allowing the use of a smaller blower fan and motor, reduced consumption of electrical power, minimization of large power surges when the blower motor turns on and off, and decreased noise due to the use of a smaller blower.

The oscillating blower device disclosed in the aforementioned U.S. Pat. No. 5,367,739 has an outlet nozzle that is generally directed toward the rear of the vehicle; in other words, the air stream emitted by such outlet nozzle generally travels in the direction from the front end of the vehicle toward the rear end of the vehicle. Thus, for example, a droplet of water initially located on the roof of the vehicle would tend to be blown backward along the roof of the vehicle toward the rear end of the vehicle by the air stream emitted by such outlet nozzle. Incidentally, as used within this specification, the phrase "toward the rear end of the vehicle" has the meaning just defined, and the phrase "toward the front end of the vehicle" refers to the opposing direction. Still referring to the aforementioned U.S. Pat. No. 5,367,739, as the vehicle is conveyed past the blowing device, the discharged air pushes water on the surface of the vehicle toward the rear end of the vehicle, effectively "stripping" excess moisture from the outer surface of the vehicle. However, as the rear window and rear end of the vehicle pass below such blowing device, the air stream is directed over and past, rather than against, the rear window and rear end of the vehicle. Thus, the rear window, trunk, rear end, and rear bumper of the vehicle are not as effectively dried as are the other surfaces of the vehicle.

U.S. Pat. No. 3,442,027 to Hurwitz discloses a blower wherein the discharge nozzle includes vanes, and wherein a piston and cylinder arrangement is used to control the position of such vanes. This system uses a feeler plate that contacts the vehicle to sense the contour of the vehicle.

U.S. Pat. No. 3,803,727 to Takeuchi discloses a vehicle dryer having a nozzle assembly that rotates from a rearwardly facing position to a forwardly facing position as the vehicle passes through the drying apparatus. This device also uses a "feeler" for engaging the external surface of the vehicle in order to sense the contour thereof.

U.S. Pat. No. 4,561,193 to Burger discloses a vehicle dryer having several discharge nozzles, some of which can be swivelled about an axle to more effectively dry the rear side of the vehicle. To permit such swivel motion, air is delivered to such nozzles by flexible conduit.

U.S. Pat. No. 4,685,169 to Nelson discloses a vehicle dryer wherein each blower has an outlet nozzle that can be oscillated. A portion of the blower housing includes a flexible coupling to permit the angular orientation of the outlet nozzle to be varied relative to the remainder of the blower housing.

Finally, U.S. Pat. No. 5,596,818 to Jones discloses a vehicle dryer having oscillating nozzles that can be pivoted by a piston to direct air either rearwardly (as when the front of the vehicle is being dried) or forwardly (as when the rear of the vehicle is being dried). This system uses a hydraulic cylinder to control the rotation of the nozzle under the control of a proximity sensor which senses the trunk and/or rear end of the vehicle. However, the nozzle must be rotatably supported so that it can pivoted by such hydraulic cylinder.

None of the above-described blowers provides the advantages of applicant's novel blower described herein.

Accordingly, it is an object of the present invention to provide a blowing device that can emit discharged air in a generally rearward direction for stripping water toward the rear end of the car, but which can emit discharged air in a generally forward direction for more effectively drying rear windows, trunks, and rear ends of vehicles.

It is another object of the present invention to provide such a blowing device that avoids significant drops in air pressure due to extensive air ducting in order to divert the flow of discharged air.

It is still another object of the present invention to provide such a blowing device that is also capable of providing an oscillating stream of air, that oscillates from side-to-side, for drying vehicles and the like, and which is compatible with the oscillating blowing device disclosed in the aforementioned U.S. Pat. No. 5,367,739.

A further object of the present invention is to provide such a blowing device that is adapted to dry the entire surface of the vehicle without any physical contact between the blowing device and the surface of the vehicle.

A still further object of the present invention to provide such a blowing device which can operate at reduced air pressures, and hence, lower noise levels, and still selectively direct the discharged air either rearwardly or forwardly.

Still another object of the present invention is to provide such a blowing device which is relatively inexpensive to construct and maintain.

These and other objects of the present invention will become more apparent to those skilled in the art as the description of the present invention proceeds.

SUMMARY OF THE INVENTION

Briefly described, and in accordance with a preferred embodiment thereof, the present invention relates to a dual port blowing device for blowing a stream of air to dry the outer surface of a vehicle. The blowing device includes a motor which rotates a circular fan having a centrally-located inlet for admitting air and having an outer periphery from which air is discharged. A housing encircles the fan and receives the air discharged therefrom. The housing includes a first outlet nozzle for directing the discharged air generally toward the rear end of the vehicle, as well as a second outlet nozzle for directing the discharged air generally toward the front end of the vehicle.

The blowing device further includes a gate movable between first and second positions; in its first position, the gate opens the first outlet nozzle for allowing discharged air to be directed out of the first outlet nozzle generally toward the rear end of the vehicle (i.e., in the direction from the front end of the vehicle toward the rear end of the vehicle), while closing the second outlet nozzle. In its second position, the gate opens the second outlet nozzle for allowing discharged air to be directed out of the second outlet nozzle generally toward the front of the vehicle (i.e., in the direction from the rear end of the vehicle toward the front end of the vehicle), while closing the first outlet nozzle. The blowing device also includes an actuator for selectively moving the gate between its first and second positions.

Preferably, the blower housing is mounted for rotation about the same axis of rotation as the motor driveshaft, and an oscillating mechanism is provided for oscillating the blower housing from side-to-side relative to the path of travel of the vehicle.

In the preferred embodiment of the present invention, the aforementioned gate is a damper that is pivotally coupled to the blower housing proximate the first and second outlet nozzles. The damper can be pivoted between a first position exposing the first outlet nozzle but covering the second outlet nozzle, and a second position covering the first outlet nozzle but exposing the second outlet nozzle. The actuator preferably includes a hydraulic cylinder and piston, the piston being extended from or retracted within the cylinder by application of hydraulic pressure to selectively move the damper between its first and second positions. Control circuitry is used to determine that the rear end of the vehicle is proximate the dual port blowing device; this control circuitry operates the actuator to move the damper from its first position to its second position as the rear end of the vehicle becomes proximate to the dual port blowing device. Preferably, such control circuitry includes a sensor for sensing both the presence and length of the vehicle while avoiding physical contact with the vehicle.

The preferred apparatus for controlling the position of the damper includes a source of compressed air, and at least one air-over-oil reservoir partially filled with hydraulic oil. A solenoid valve is electrically coupled to the aforementioned control circuitry for selectively routing compressed air to the air-over-oil reservoir for pressurizing the hydraulic oil therein. A hydraulic hose leads from the air-over-oil reservoir to the hydraulic cylinder for advancing or retracting the piston, thereby determining the position of the damper.

BRIEF DESCRIPTION OF THE DRAWINGS

FIG. 1 is a side view of a car wash equipment assembly including a vehicle sensor, a washing station, and a blowing device constructed in accordance with a preferred embodiment of the present invention for directing a stream of air at the surface of a vehicle.

FIG. 2 is a side view of the blowing device shown in FIG. 1 but wherein the front end of the vehicle is proximate such blowing device.

DETAILED DESCRIPTION OF THE PREFERRED EMBODIMENT

Figure 3:
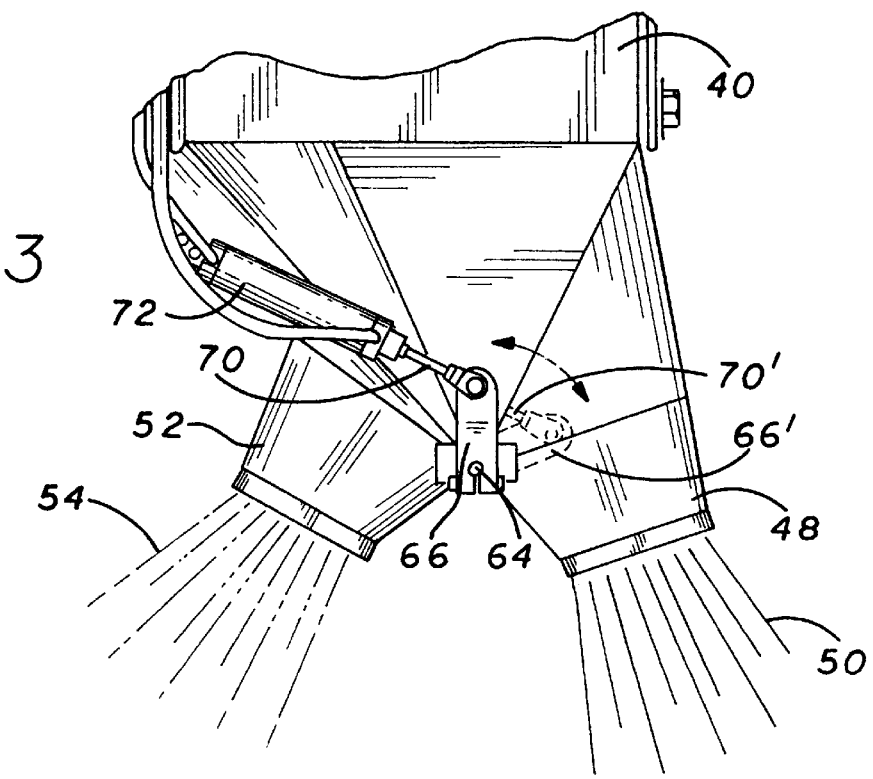
FIG. 3 is an enlarged view of the discharge portion of the blowing device shown in FIG. 2, and corresponding to the area indicated by dashed circle 3 within FIG. 2.

A vehicle washing system is shown in FIG. 1 and is designated generally therein by reference numeral 20. Vehicle washing system 20 includes a buried metal sensor 22, also known as a magnetic loop gate switch, located near the entry thereof. Metal sensor 22 serves not only to sense the initial presence of vehicle 24, but can also be used to sense the approximate length of vehicle 24, particularly when vehicle 24 is conveyed through washing system 20 at a fixed speed, as by a conveyor belt. Often, the conveyor belt will itself operate a conveyor clock switch (not shown) that generates conveyor timing pulses for detecting the speed of the conveyor belt. Metal sensor 22 is electrically coupled by wiring 25 with a control computer 26 which is used to properly sequence the washing and drying functions of washing system 20.

As shown in FIG. 1, washing system 20 includes a washing station 28 which applies soapy water to the surfaces of the vehicle, brushes the surfaces of the vehicle, and rinses the vehicle, to remove dirt and grime therefrom. Washing station 28 is coupled by wiring 30 to control computer 26, and the timing of the application of the soapy water, rinse water, and the movement of the brushes is controlled by control computer 26. As indicated in FIG. 1, the last station in washing system 20 is a blowing device 32 used to blow air in order to dry the surfaces of vehicle 24. Blowing device 32 is also electrically coupled to control computer 26 by wiring 34 in order to properly sequence the operations performed by blowing device 32. As shown in FIGS. 1 and 2, blowing device 32 is supported by a frame member 36 at a height which exceeds the height of the tallest vehicle to be advanced through washing system 20. The support frame for blowing device 32 may actually be in the form of an archway, including standards that are positioned at opposing sides of the vehicle path and spaced apart from each other by a distance which exceeds the width of the widest vehicle to be advanced through washing system 20.

Figure 5:
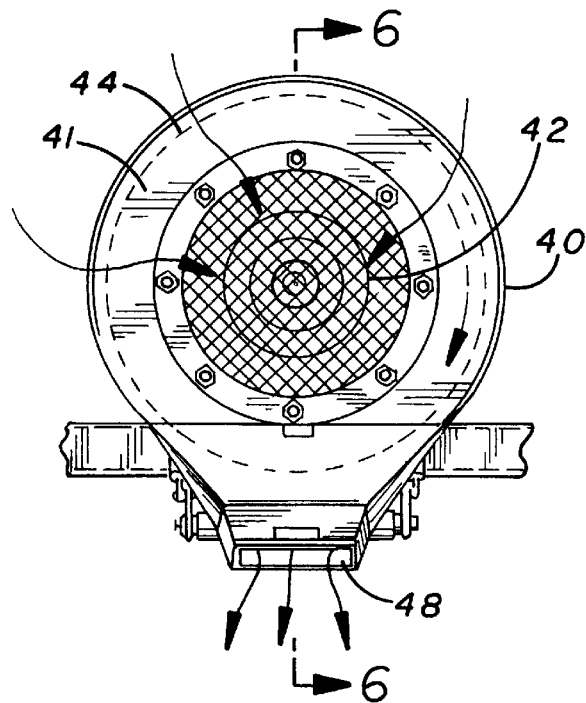
FIG. 5 is a front view of the blowing device shown in FIGS. 1 and 2.

As indicated in FIGS. 1 and 2, blowing device 32 includes a motor 38; motor 38 rotates a driveshaft (not shown) which, in turn rotates a circular fan 41 (see FIG. 5), also known as a turbine fan, encircled by and within housing 40. As shown in FIG. 5, housing 40 and circular fan 41 rotatably supported therein, have a centrally-located inlet 42 for admitting air. Circular fan 41 has an outer periphery, designated by dashed lines 44 in FIG. 5, and causes air to be discharged from outer periphery 44 when circular fan 41 is rotated by motor 38. Blower housing 40 receives such discharged air for delivery toward vehicle 24. Ideally, blower housing 40 is rotatably supported about the same axis as the driveshaft of motor 38, via rocker arm 46, to allow blower housing 40 to be oscillated in a side-to-side motion. For further details as to the manner of rotatably supporting and oscillating blower housing 40, see the disclosure of U.S. Pat. No. 5,367,739, the text and drawings of which are incorporated herein by reference.

As shown in FIGS. 1–4, blower housing 40 includes a first outlet nozzle 48 for directing the discharged air generally toward the rear end of vehicle 24. Within FIG. 2, air stream 50 represents air discharged from first outlet nozzle 48 generally toward the rear of vehicle 24. Blower housing 40 also includes a second outlet nozzle 52 for directing discharged air generally toward the front end of vehicle 24. Within FIG. 1, air stream 54 represents air discharged from second outlet nozzle 52 generally toward the front of vehicle 24. First and second outlet nozzles are each preferably angled at approximately 15 degrees relative to vertical.

Figure 4:
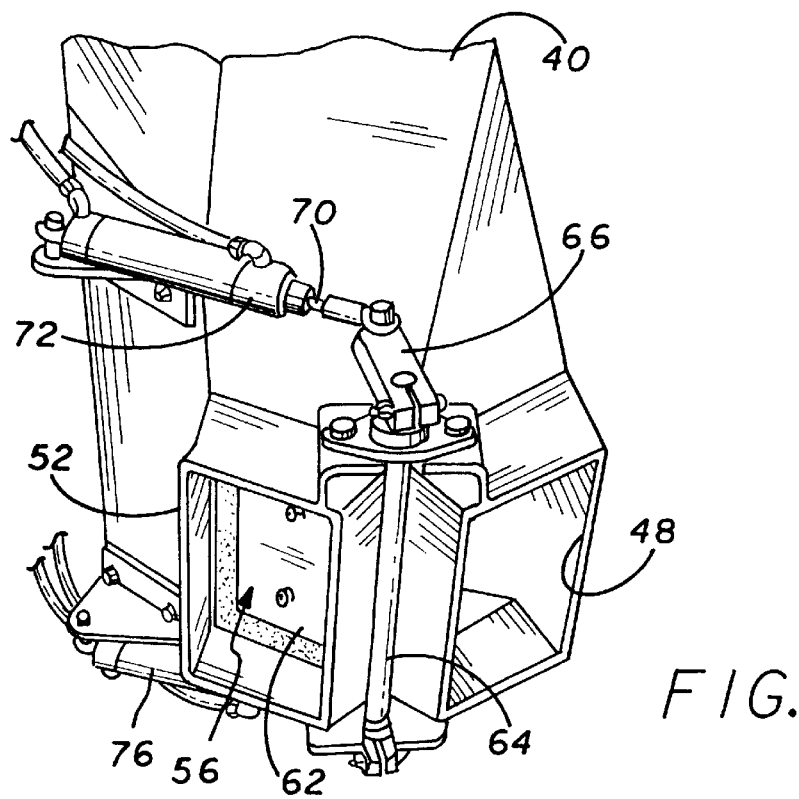
FIG. 4 is a perspective view of the discharge nozzles of the blowing device shown in FIG. 3.
Figure 6:
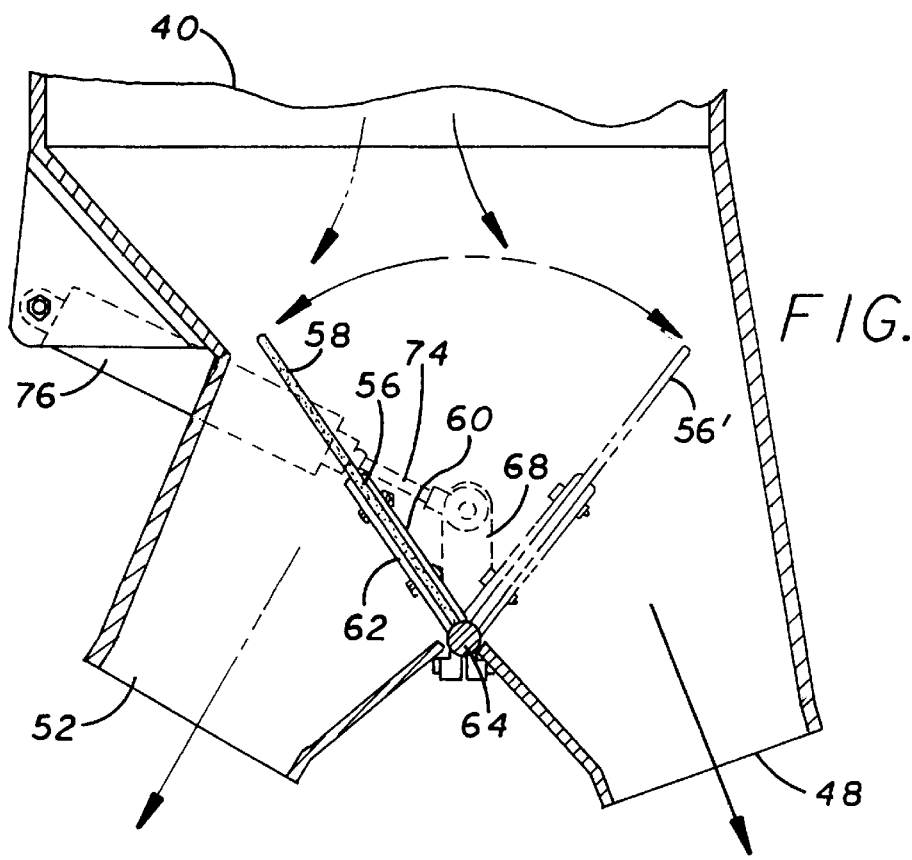
FIG. 6 is a sectional view of the discharge nozzles shown in FIG. 3 and showing the pivoting damper that steers discharged air through one of such outlet nozzles.
Figure 7:
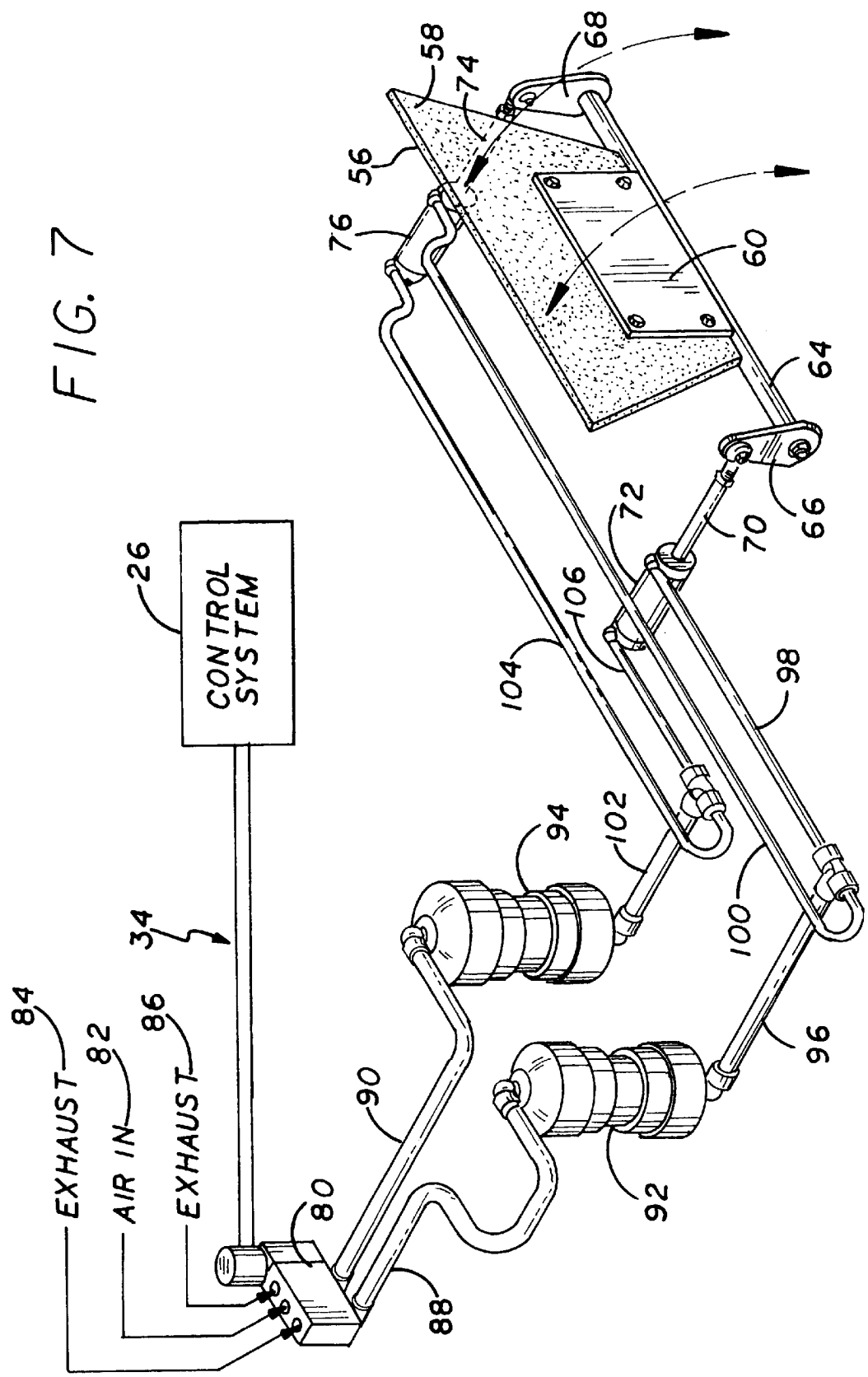
FIG. 7 is a schematic view of the damper of FIG. 6, the hydraulic cylinders that control the position of such damper, and the control system used to control the application of hydraulic pressure thereto.

Turning to FIGS. 3 and 4, first and second outlet nozzles 48 and 52 are shown in greater detail. Visible within FIG. 4, and also visible within FIGS. 5 and 7, is a damper 56. Damper 56 functions like a gate and is movable between first and second positions. In FIG. 4, damper 56 is shown in its first position wherein first outlet nozzle 48 is open for allowing discharged air to be directed out of first outlet nozzle 48. In FIG. 4, it can be seen that damper 56 closes off second outlet nozzle 52. Within FIG. 6, damper 56 is shown in solid lines near its first position, i.e., it has almost completed movement toward its first position for closing off second outlet nozzle 52. Damper 56 also has a second position wherein it closes off first outlet nozzle 48 and opens up second outlet nozzle 52 for allowing discharged air to be directed out of second outlet nozzle 52. Within FIG. 6, damper 56 is shown in dashed outline near its second position, i.e., it has almost completed movement toward its second position for closing off first outlet nozzle 48. As shown in FIGS. 4, 6 and 7, damper 56 is preferably formed of a trapezoidal shaped flap 58 of rubber reinforced on either side by a pair of smaller-dimensioned steel plates 60 and 62 bolted to each other. The rubber flap 58 forms a relatively air-tight seal with outlet nozzles 48 and 52 and is resilient enough to withstand slapping of damper 56 against such outlet nozzles when damper 56 changes position.

As shown in FIGS. 3, 4, 6 and 7, damper 56 is secured to, and rotatably supported by, a pivot axle 64, which is, in turn, rotatably supported by blower housing 40. In this manner, pivot axle 64 pivotally couples damper 56 to blower housing 40. Pivot axle 64 is secured at its opposing ends to crank arms 66 and 68.

In order to move damper 56 between its first and second positions, crank arm 66 is coupled to piston rod 70 of a double-acting hydraulic cylinder 72, and crank arm 68 is coupled to piston rod 74 of double-acting hydraulic cylinder 76. Hydraulic cylinders 72 and 76 are preferably identical to each other and may be of the type commercially available from American Cylinder Co., Inc. under the designation "Double Acting/Universal Mount". Hydraulic cylinders 72 and 76, and related piston rods 70 and 74, serve as actuators for selectively moving damper 56 between its first position, exposing first outlet nozzle 48 and covering second outlet nozzle 52 (see FIG. 4), and its second position covering first outlet nozzle 48 and exposing second outlet nozzle 48. Referring to FIGS. 3, 4, 6 and 7, when piston rods 70 and 74 are retracted within cylinders 72 and 76, respectively, then damper 56 is in its first position; when piston rods 70 and 74 are extended from cylinders 72 and 76, respectively, as indicated by the dashed lines designated 66' and 70' in FIG. 3, then damper 56 is in its second position. Hydraulic cylinders 72 and 76 are operated in parallel with each other; while a single hydraulic cylinder could be used, significant torsional forces are created on pivot axle 64 as damper 56 is switched between its first position and its second position, and the use of hydraulic cylinders on both ends of pivot axle 64 distributes such torsional forces for smoother operation.

Referring again to FIG. 1, metal sensor 22 and control computer 26 serve to signal blower device 32 when it is time for damper 56 to switch positions. Control computer 26 may be of the type commercially available from Westview Instruments, Inc., Industrial Controls Division, of Houston, Texas, under the brand name "DATATRAX MAGNUM" carwash controller. Control computer 26 signals blowing device 32 that vehicle 24 is approaching, and that damper 56 should be in its first position to direct discharged air through first outlet nozzle 48 rearwardly relative to vehicle 24; accordingly, control computer 26 directs cylinders 72 and 76 to retract pistons 70 and 74. As the rear end of the vehicle becomes proximate to blower device 32, control computer 26 signals blowing device 32 to switch the position of damper 56 to its second position to discharge air through second outlet nozzle 52 to dry the rear window, trunk, and rear end of vehicle 24; accordingly, control computer 26 signals directs cylinders 72 and 76 to extend piston rods 70 and 74.

The interface of control computer 26 to hydraulic cylinders 72 and 76 will now be described in greater detail in conjunction with the schematic drawing of FIG. 7. Control computer 26 is coupled by electrical wiring 34, and by an electrical relay (not shown) to allow such control signals to control solenoid valve block 80. Solenoid valve block 80 also includes a port 82 coupled to a source of compressed air (not shown) and two air exhaust ports 84 and 86. Solenoid valve block 80 also includes a port coupled with a first hose 88 and a second hose 90. Hose 88 leads to the upper port of a first air-over-oil reservoir 92, also known as an "oil pot", and hose 90 leads to the upper port of a second air-over-oil reservoir 94. Both reservoirs 92 and 94 are partially filled with hydraulic oil.

When control computer 26 commands that damper 56 assume its first position, solenoid valve block 80 allows compressed air to flow into hose 88, thereby pressurizing reservoir 92 and the hydraulic oil therein; at the same time, solenoid valve block 80 opens hose 90 to exhaust port 86 to relieve any pressure within hose 90, thereby relieving any pressure on the hydraulic oil in reservoir 94. The pressurized hydraulic oil in reservoir 92 flows into hoses 96, 98, and 100, forcing piston rods 70 and 74 to retract within cylinders 72 and 76, respectively. On the other hand, when control computer 26 commands that damper 56 assume its second position, as when the rear end of the vehicle is within approximately 60 inches of blowing device 32, solenoid valve block 80 allows compressed air to flow into hose 90, thereby pressurizing reservoir 94 and the hydraulic oil therein; at the same time, solenoid valve block 80 opens hose 88 to exhaust port 84 to relieve any pressure within hose 88, thereby relieving any pressure on the hydraulic oil in reservoir 92. The pressurized hydraulic oil in reservoir 94 flows into hoses 102, 104, and 106, forcing piston rods 70 and 74 to extend from cylinders 72 and 76, respectively. While it is theoretically possible to use compressed air to directly actuate cylinders 72 and 76, damper 56 applies a large amount of torque to pivot axle 64 as it switches between its first and second positions, and the hydraulic oil, being less compressible than air, better absorbs the torque applied to damper 56, and allows for smoother operation.

Those skilled in the art will now appreciate that a dual port blowing device has been described which is adapted to emit discharged air in a generally rearward direction for stripping water toward the rear end of a vehicle, but which can emit discharged air in a generally forward direction for more effectively drying rear windows, trunks, and rear ends of vehicles. The disclosed blowing device avoids significant drops in air pressure associated with dryers that require extensive air ducting, and is, if desired, capable of providing an oscillating stream of air that oscillates from side-to-side. The blowing device described herein is adapted to dry the entire surface of the vehicle without any physical contact between the blowing device and the surface of the vehicle, and yet is relatively inexpensive to construct and maintain. The disclosed dual port blowing device can operate at reduced air pressures, and hence, lower noise levels, and still selectively direct the discharged air either rearwardly or forwardly.

While the present invention has been described with respect to a preferred embodiment thereof, such description is for illustrative purposes only, and is not to be construed as limiting the scope of the invention. For example, while illustrated as a top-mounted blowing device, the disclosed blowing device can also be provided as a side-mount blower. Various modifications and changes may be made to the described embodiment by those skilled in the art without departing from the true spirit and scope of the invention as defined by the appended claims.

I claim:

1. A dual port blowing device for blowing a stream of air at an outer surface of a vehicle for drying the vehicle as said vehicle is conveyed past said dual port blowing device, the vehicle having opposing front and rear ends, and said dual port blowing device comprising in combination:
   a. a motor having a rotatable motor shaft and;
   b. a circular fan coupled to said motor shaft for being rotated thereby, said circular fan having a centrally-located inlet for admitting air, said circular fan having an outer periphery and causing air to be discharged from the outer periphery thereof when said circular fan is rotated by said motor;
   c. a housing encircling said circular fan, said housing receiving the air discharged from the outer periphery of said circular fan, said housing including a first outlet nozzle for directing the discharged air generally toward the rear end of the vehicle, said housing including a second outlet nozzle for directing the discharged air generally toward the front end of the vehicle;
   d. a gate movable between first and second positions, the first position of said gate opening said first outlet nozzle for allowing discharged air to be directed out of said first outlet nozzle while closing said second outlet nozzle, and the second position of said gate opening said second outlet nozzle for allowing discharged air to be directed out of said second outlet nozzle while closing said first outlet nozzle; and
   e. an actuator for selectively moving said gate between said first and second positions.

2. The dual port blowing device recited by claim 1 wherein the motor shaft of said motor extends along an axis of rotation, and wherein said housing is mounted for rotation about said axis of rotation, said dual port blowing device including means for oscillating said housing about said axis of rotation.

3. The dual port blowing device recited by claim 1 wherein said gate is a damper pivotally coupled to said housing, said damper being movable between a first position exposing said first outlet nozzle and covering said second outlet nozzle, and a second position covering said first outlet nozzle and exposing said second outlet nozzle.

4. The dual port blowing device recited by claim 1 wherein said actuator includes a hydraulic cylinder and piston, said piston being extended from or retracted within said cylinder by application of hydraulic pressure to selectively move said gate between said first and second positions.

5. The dual port blowing device recited by claim 1 wherein said gate is a damper pivotally coupled to said housing, said damper being movable between a first position exposing said first outlet nozzle and covering said second outlet nozzle, and a second position covering said first outlet nozzle and exposing said second outlet nozzle, and wherein said actuator includes a hydraulic cylinder and piston, said piston being extended from or retracted within said cylinder by application of hydraulic pressure to selectively pivot said damper between said first and second positions.

6. The dual port blowing device recited by claim 1 including control circuitry for determining that the rear end of the vehicle is proximate said dual port blowing device, said control circuitry operating said actuator to move said gate from said first position to said second position as the rear end of the vehicle becomes proximate to said dual port blowing device.

7. The dual port blowing device recited by claim 6 wherein said control circuitry includes a sensor for sensing the presence and length of the vehicle.

8. The dual port blowing device recited by claim 7 wherein said sensor included within said control circuitry avoids physical contact with the vehicle.

9. The dual port blowing device recited by claim 6 wherein:
   a. said gate is a damper pivotally coupled to said housing, said damper being movable between the first position exposing said first outlet nozzle and covering said second outlet nozzle, and the second position covering said first outlet nozzle and exposing said second outlet nozzle; and
   b. said actuator includes a hydraulic cylinder and piston, said piston being extended from or retracted within said cylinder by application of hydraulic pressure to selectively pivot said damper between said first and second positions;

said dual port blowing device further comprising:
   c. a source of compressed air;
   d. at least one air-over-oil reservoir partially filled with hydraulic oil;
   e. a solenoid valve controlled by said control circuitry for selectively routing compressed air from said source of compressed air to said at least one air-over-oil reservoir for pressurizing the hydraulic oil therein; and
   f. conduit coupling the oil in said at least one air-over-oil reservoir to said hydraulic cylinder for extending or retracting said piston relative to said cylinder in order to determine the position of said damper.

* * * * *